Patented Mar. 1, 1938

2,109,662

UNITED STATES PATENT OFFICE 2,109,662

MANUFACTURE OF RUBBER-CEMENT OR RUBBER-CEMENT-ASPHALTIC COMPOSITIONS

George Parry Davis, Bondi Beach, near Sydney, Australia

No Drawing. Application July 13, 1936, Serial No. 90,385. In Australia July 13, 1935

5 Claims. (Cl. 106—23)

This invention relates to the manufacture of compositions of rubber and cement or of rubber, cement, and asphalt in a slurry or mortar form, the latter having added thereto to provide a final product for use fillers and/or aggregates.

For such manufacture rubber straight emulsions and rubber asphaltic straight emulsions with other materials added to the same are used and a proportion of such emulsions is added to the gauging water utilized in connection with a proportion of cement which is used in the slurry or mortar the latter as a composition being capable of use for industrial and other purposes when suitable fillers and/or aggregates have been added thereto.

Rubber latex or vulcanized rubber latex of natural or synthetic origin is used in the manufacture of the emulsions; similarly the cement used may be Portland or other cement. The asphaltic emulsion may be any asphaltic commercial straight emulsion. With the rubber straight emulsions are incorporated a keratinous solution such as alkaline hydrosol of leather waste, or of wool, or of feathers and waterglass solution, and with the rubber asphaltic straight emulsions is incorporated a solution of keratinous hydrosol. Said compounded emulsions have also added to them a proportion of water to form either the desired slurry or mortar.

In the manufacture of the rubber straight emulsion the rubber latex is incorporated with the waterglass solution and with the keratinous solution and with added water. The emulsion thus obtained will be white in color.

The rubber asphaltic straight emulsion is manufactured by incorporating the asphaltic emulsion with the rubber latex emulsion and with the keratinous solution, also with the added water. The final emulsion in this case will be of dark or black color.

As an example of materials in the approximate proportions for the manufacture of a white rubberized straight emulsion as above mentioned the following is given:—

|  | Pints |
|---|---|
| Rubber latex (7.5 dry rubber content) | 8 |
| Waterglass | 3.6 |
| Keratinous hydrosol | 2 |
| Added water | 10 |
|  | 23.6 |

The above compound of 23.6 pints contains 7½ lbs. dry rubber solids and it also contains 6.05 lbs. of waterglass (waterglass weighs 14 lbs. per gallon). By increasing the quantity of keratinous hydrosol you are enabled to increase the amount of waterglass and/or rubber and decrease the amount of water in the compound.

An example is also given below of materials in approximate proportions for the manufacture of a dark or black coloured rubber asphalt straight emulsion:—

|  | Pints |
|---|---|
| Rubber latex (7.5 dry rubber content) | 8 |
| Asphaltic straight emulsion | 7¼ |
| Keratinous hydrosol | 2 |
| Added water | 6½ |
|  | 23¾ |

The above compound of 23.75 pints contains 7½ lbs. dry rubber solids, and it also contains approximately 4½ lbs. of asphalt solids (7½ pints asphaltic straight emulsion weighs approximately 9 lbs.). By increasing the quantity of keratinous hydrosol you are enabled to increase the quantity of asphalt and/or rubber and decrease the amount of added water.

Said emulsions herein described are added to the gauging water of the cement per each 1 lb. of cement used in the slurry or mortar. The proportion of said emulsions to be added to such gauging water can be approximately ½ oz. to 6 ozs.

The fillers used may be sand or otherwise and the aggregates used may be stone or otherwise. These fillers or aggregates can as desired be added to the slurry or mortar above described so as to form a composition for use.

The said slurry or mortar with added fillers or aggregates can be used as thin or other surfacings or resurfacings for roads, pavements, floors, pipes, walls, roofs or the like, the final compositions or products rubber-proofing and corrosion-proofing the cement against damage by sulphate waters and lactic and other acids, and serving as well to offer resistance to gas and acids. Said final compositions or products can also be utilized for the lining or spinning of pipes.

The alkaline hydrosol or keratinous solution herein referred to is obtainable by macerating or digesting the keratinous material such as oak tanned leather waste with washing soda or caustic soda or potash, or such as wool or feathers with washing soda or caustic soda or potash. Boiling facilitates and quickens the operation of obtaining the necessary extract or solution.

The following are given as examples of materials which can be utilized in the preparation of the said keratinous solution.

1. Oak tanned powder leather
   waste _____ pounds__ 2½
   Washing soda or caustic soda or
   potash _____ pound__ ½
   Water _____ gallons__ 5

2. Low grade wool (crutchings or
   dage) _____ pounds__ 2½
   Washing soda or caustic soda or
   potash _____ pound__ ½
   Water _____ gallons__ 5

By the term "gauging water" herein referred to it is implied the volume of water required to slurry cement. If 1 volume of water is essential to form a slurry or mortar it will require 1 volume of water plus either or both of the emulsions described to produce the required slurry or mortar.

What I claim as my invention and desire to secure by Letters Patent is:—

1. A rubber-cement composition in slurry or mortar form, comprising a mixture of cement and an emulsion of rubber in a solution of keratinous hydrosol and water glass, the water in such emulsion constituting the continuous phase.

2. A rubber-cement composition as in claim 1, in which the water content of the mixture is in excess of the gauging water by the amount required to emulsify the rubber prior to its admixture with the cement.

3. A rubber-cement composition in slurry or mortar form, comprising a mixture of cement and an emulsion of rubber and asphaltic material in an alkaline protalbinate solution in the form of keratinous hydrosol.

4. A rubber-cement composition as in claim 3, in which the water content of the mixture is in excess of the gauging water by the amount required to emulsify the rubber and asphaltic material prior to its admixture with the cement.

5. A rubber-cement composition as in claim 1, in which the cement forms the major part of the solid constituents of the mixture.

GEORGE PARRY DAVIS.